(12) United States Patent
Dilligan et al.

(10) Patent No.: US 9,108,363 B2
(45) Date of Patent: Aug. 18, 2015

(54) THIN WALL BUSHING FOR ROBUST ELECTRICAL BONDING TO FIBER-REINFORCED STRUCTURES

(75) Inventors: Matthew Anthony Dilligan, Seattle, WA (US); James P. Irwin, Renton, WA (US); Christopher Newbolt, Seattle, WA (US); Peter A. Coronado, Renton, WA (US); Benjamin A. Johnson, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 590 days.

(21) Appl. No.: 13/267,504

(22) Filed: Oct. 6, 2011

(65) Prior Publication Data

US 2013/0087380 A1   Apr. 11, 2013

(51) Int. Cl.

| | | |
|---|---|---|
| *H02G 3/18* | (2006.01) | |
| *B23P 11/00* | (2006.01) | |
| *B29C 65/00* | (2006.01) | |
| *B29C 65/56* | (2006.01) | |
| *B29C 65/64* | (2006.01) | |
| *B64D 45/02* | (2006.01) | |
| *F16B 5/01* | (2006.01) | |

(Continued)

(52) U.S. Cl.
CPC ............. *B29C 66/742* (2013.01); *B29C 65/565* (2013.01); *B29C 65/64* (2013.01); *B29C 66/131* (2013.01); *B29C 66/474* (2013.01); *B29C 66/7212* (2013.01); *B29C 66/72141* (2013.01); *B29C 66/73111* (2013.01); *B29C 66/73141* (2013.01); *B64D 45/02* (2013.01); *F16B 5/01* (2013.01); *B29C 66/74283* (2013.01); *B29C 2793/0045* (2013.01); *B29C 2793/0081* (2013.01); *B29L 2031/3076* (2013.01); *B29L 2031/737* (2013.01); *F16B 2001/0064* (2013.01); *Y10T 29/49826* (2015.01)

(58) Field of Classification Search
CPC .................................................... B60R 16/0222
USPC .............................................. 174/650; 29/428
See application file for complete search history.

(56) References Cited

U.S. PATENT DOCUMENTS 3,566,662 A * 3/1971 Champoux ................. 72/370.07
4,702,655 A * 10/1987 Kendall .......................... 411/43

(Continued)

FOREIGN PATENT DOCUMENTS

EP          0468563        1/1992

OTHER PUBLICATIONS

PCT, International Search Report and Written Opinion, PCT/US2012/054019 (Dec. 18, 2012).

(Continued)

*Primary Examiner* — Timothy Thompson
*Assistant Examiner* — Sherman Ng
(74) *Attorney, Agent, or Firm* — Robert Parker

(57) ABSTRACT

A method for directing electrical current to prevent sparking from the interaction between a composite structure and lightning or static electrical charge, the method including the steps of forming a hole in a composite structure; and positioning a bushing into the hole to create an interference fit between the bushing and the composite structure, wherein the bushing is formed of a material that has a coefficient of thermal expansion close to the coefficient of thermal expansion of the composite structure and the bushing provides an electrical path between a fastener disposed in the bushing and the composite structure.

20 Claims, 4 Drawing Sheets

(51) Int. Cl.
　　*B29L 31/00* (2006.01)
　　*B29L 31/30* (2006.01)
　　*F16B 1/00* (2006.01)

(56) References Cited

U.S. PATENT DOCUMENTS

| | | | |
|---|---|---|---|
| 5,083,363 A * | 1/1992 | Ransom et al. | 29/523 |
| 5,341,559 A * | 8/1994 | Reid et al. | 29/523 |
| 7,277,266 B1 | 10/2007 | Le et al. | |
| 7,387,277 B2 | 6/2008 | Kordel et al. | |
| 2005/0262682 A1 * | 12/2005 | Grover et al. | 29/428 |
| 2007/0110541 A1 * | 5/2007 | Rawlins et al. | 411/54.1 |
| 2007/0180885 A1 * | 8/2007 | Johnson | 72/391.4 |
| 2007/0295050 A1 * | 12/2007 | Glenn | 72/370.07 |
| 2008/0078864 A1 * | 4/2008 | Wilkerson et al. | 244/1 A |
| 2008/0101887 A1 | 5/2008 | Toosky et al. | |
| 2008/0250603 A1 * | 10/2008 | Skinner et al. | 16/2.2 |
| 2008/0297967 A1 | 12/2008 | Winter et al. | |
| 2009/0035084 A1 | 2/2009 | Lipczynski et al. | |
| 2009/0178262 A1 * | 7/2009 | Reid et al. | 29/263 |
| 2009/0304315 A1 * | 12/2009 | Johnson | 384/295 |
| 2010/0108804 A1 | 5/2010 | Oguri et al. | |
| 2010/0219287 A1 | 9/2010 | Sanchez-Brunete Alvarez et al. | |
| 2010/0260572 A1 * | 10/2010 | Wehrmeister et al. | 411/43 |
| 2010/0320315 A1 | 12/2010 | Kashiwagi et al. | |

OTHER PUBLICATIONS

Ransom, J. et al., "Hole Protection With Expanded Grommets in Carbon Fiber Reinforced Plastic," Global Material Technology: Soaring to New Horizons: 2009 SAMPE Fall Technical Conference & Exhibition, Oct. 19-22, 2009, Wichita, Kansas; Covina: Society for the Advancement of Material and Process Engineering, Jan. 1, 2009, pp. 1-12.

* cited by examiner

THIN WALL BUSHING FOR ROBUST ELECTRICAL BONDING TO FIBER-REINFORCED STRUCTURES

FIELD

The present patent application relates to methods for providing robust electrical bonding to carbon fiber-reinforced structures using thin wall bushings and methods for providing electromagnetic effects (EME) protection by enabling the transfer of large transient lightning currents from fastener to composite without a spark being released as an ignition source into a flammable region by the installation. More particularly, the present application relates to the use of thin wall bushings to provide a direct ground between clearance fit fasteners and a composite structure.

BACKGROUND

Carbon fiber reinforced plastic ("CFRP") materials are increasingly being used in place of metals to form the skin panels and primary structural members of commercial airplanes. CFRP materials are advantageous compared to metals due to the higher strength-to-weight ratios provided by these materials. However, CFRP materials are much less conductive than metallic materials, and as a result require special consideration related to the effects of lightning strikes, static charge buildup, and other electro-magnetic effects (EME). In particular, CFRP materials do not readily provide low-resistance paths to dissipate the electrical potentials that are generated during these events, a condition that can lead to the production of heat and sparks. The poor conductivity of CFRP materials in the primary structure can also result in higher electrical currents in metallic substructure and systems components, requiring additional complexity in those components to prevent the production of heat and sparks. This is particularly important in wing structures that are also used to contain fuel, due to the presence of the flammable fuel and fuel vapors. In these areas prevention of sparking is very important due to the potential for ignition of fuel vapors and the resultant consequences of fire or explosion.

Of particular interest are the interconnections between metallic systems components and the composite structure at locations where there can be large lightning currents transferred across the connections. An example of such an interconnection is the penetration of a composite bulkhead of a fuel tank in a composite wing by a metallic system component such as a fuel line or hydraulic line. The metal system components can be a preferred path for lightning, and the resulting current will be transferred to the CFRP structure at the bulkhead penetration.

At such a location, there is significant potential for generation of heat or sparks during the transfer of current between the metallic system component and the CFRP structure. To prevent this, the generally accepted practice is to provide a stable, reliable current path with electrical resistance that is sufficiently low to prevent heating of the composite material due to the transferred current. Preventing heating of the composite materials prevents the production of high pressure gas and the expulsion of hot particles, commonly observed as a spark.

At these locations, the metallic system components are mechanically attached to the composite structure using metallic bolts or similar fasteners, installed though holes that have been drilled in the composite structure. For practical consideration related to the assembly and maintenance of the aircraft, the holes through which the fasteners are installed are larger in diameter than the fasteners. As a result, the surfaces of the fasteners are not reliably in contact with the inner surfaces of the drilled holes, and do not provide a reliable, low-resistance current path.

Current solutions to prevent heating and sparking involve the use of secondary bonding jumpers and other features to ensure sufficient and reliable conductivity at these locations. Those features add significant weight and complexity to the structure, and their non-integrated nature could result in the features being omitted or otherwise compromised during manufacture or maintenance. Investigation of alternative methods continues to provide additional protection while minimizing additional weight and complexity.

Accordingly, those skilled in the art continue to seek new techniques for providing a good electrical connection to the CFRP to prevent sparking that could result from lightning strikes and static charge accumulation. A robust electrical connection at the wall of a tank is desirable to deter current flow through sensitive components inside the tank and to prevent the occurrence of heating or sparking, which can be particularly hazardous in the fuel-filled structures within an aircraft.

SUMMARY

In one aspect, the disclosed method includes forming a hole in a composite structure; and positioning a bushing into the hole to create an interference fit between the bushing and the composite structure, wherein the bushing is formed of a material that has a coefficient of thermal expansion close to the coefficient of thermal expansion of the composite structure. The bushing provides an electrical path between a fastener disposed in the bushing and the composite structure, with the path going though the outside diameter of the bushing to exposed carbon fibers on the inside diameter of the hole in the composite structure.

In another aspect the walls of the bushing are thin, being composed of pure metal material or metal alloy having high shear and elastic modulus. The use of a material with high stiffness allows the walls of the bushing to be thin, reducing the weight of the bushing and reducing the size of the hole required for installation.

In another aspect, a method of installing a bushing in a hole in a composite structure is described. The disclosed method utilizes a mandrel having, in order, a bushing support section, a tapered lead-in section, and a straight positioning section, wherein the tapered lead-in section increases in diameter from the positioning section to a maximum diameter just less than the bushing outer diameter immediately adjacent to the bushing support section. Between the maximum diameter of the lead-in section and the support section there is a step where the diameter is reduced to a constant diameter through the bushing support section. The lead-in section gradually expands the hole to smooth entry of the bushing. The bushing is installed on the bushing support section of the mandrel and then the straight positioning section of the mandrel is inserted into the hole. The mandrel is moved through the hole thereby temporarily expanding the hole radially to facilitate installation of the bushing in the hole and to create an interference fit between the bushing and the composite structure. In accordance with certain aspects, the bushing is formed of a material that has a coefficient of thermal expansion close to the coefficient of thermal expansion of the composite structure and the bushing provides an electrical path between a fastener disposed in the bushing and the composite structure.

Other aspects of the disclosed methods for minimizing the effects of lightning strikes will become apparent from the following description, the accompanying drawings and the appended claims.

DETAILED DESCRIPTION

Figure 1:
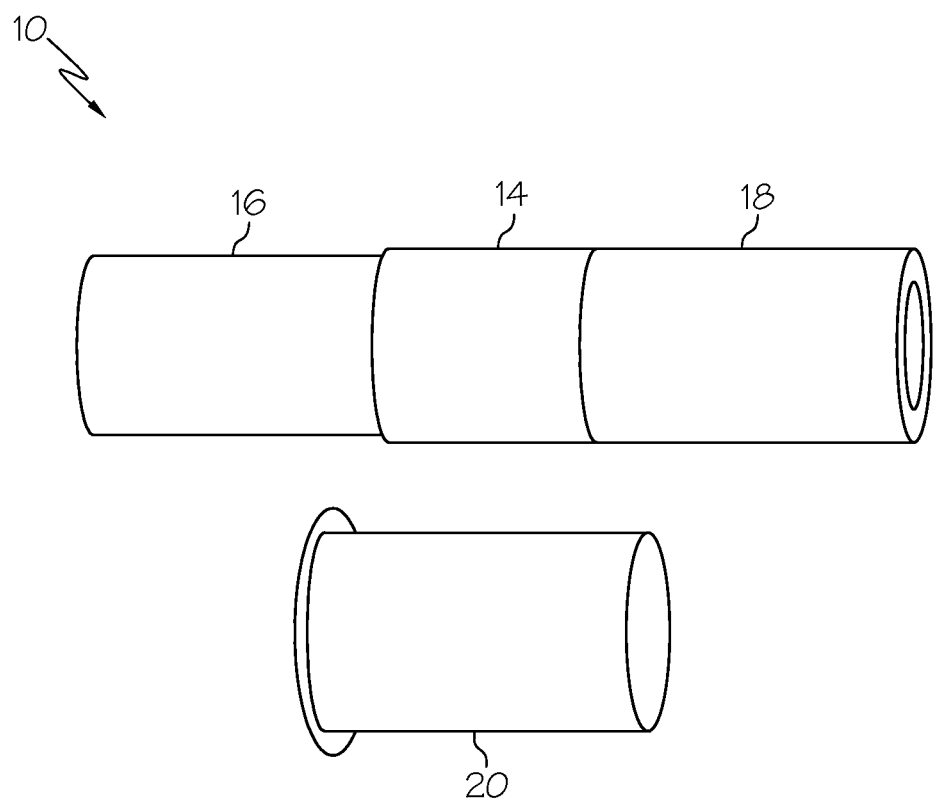
FIG. 1 is a side perspective view of an installation mandrel and bushing in accordance with one aspect of the present application.

In accordance with one aspect, the present application describes a method for providing a robust electrical path to conduct electrical current into a composite structure, wherein the method includes forming a hole in the composite structure and positioning a bushing into the hole to create an interference fit between the bushing and the composite structure. The bushing is formed of a material that has a coefficient of thermal expansion (CTE) close to the coefficient of thermal expansion of the composite structure and the bushing provides an electrical path between a fastener disposed in the bushing and the composite structure. The carbon fibers in CFRP are sufficiently conductive to enable the lightning current or static charge buildup to flow from the bushing at low electric potential and without excessive heating in the composite, but these fibers are not generally exposed on the surface of composite structures. The forming of a hole exposes the ends of fibers within the CFRP structure to which the bushing forms a conductive path. This conductive path is generated and maintained by means of direct intimate contact at high mechanical pressure between the outer wall of the bushing and the inner wall of the composite hole. This mechanical pressure is generated and maintained by means of an interference fit, whereby the relaxed outer diameter of the bushing is greater than the relaxed inner diameter of the generated hole. Use of a material for the bushing with a CTE similar to that of CFRP ensures that this preload is maintained through the temperature cycles normally experienced in service.

In accordance with another aspect, the present application describes a method of installing a bushing in a hole in a composite structure. The method includes providing a mandrel having a bushing support section, a tapered lead-in section, and a straight positioning section, wherein the tapered lead-in section increases in diameter from the straight positioning section to a maximum diameter directly adjacent to the bushing support section, installing the bushing on the bushing support section of the mandrel, inserting the straight positioning section of the mandrel into the hole, and moving the mandrel through the hole thereby temporarily expanding the hole radially to facilitate installation of the bushing in the hole and the creation of an interference fit between the bushing and the composite structure. Neither the movement of the mandrel nor the insertion of the bushing permanently deforms the composite. When the mandrel is removed and the bushing installation complete, the composite material around the hole will try to return to its original diameter, creating the interference fit that ensures a reliable electrical path between the bushing and the CFRP structure. In accordance with certain embodiments, the bushing is formed of a metal material that has good electrical conductivity, high mechanical stiffness and strength to ensure large interference and high pressure contact between bushing and hole at minimal wall thickness of bushing and a coefficient of thermal expansion close to the coefficient of thermal expansion of the composite structure to enable the bushing to provide a lightning tolerant electrical path between a fastener disposed in the bushing and the composite structure through the temperature cycles normally experienced in service.

As is known to those skilled in the art, a "composite" structure comprises a plurality of layers of structural fibers within a resin matrix. CFRP materials are only one example of appropriate composite structures.

Figure 2:
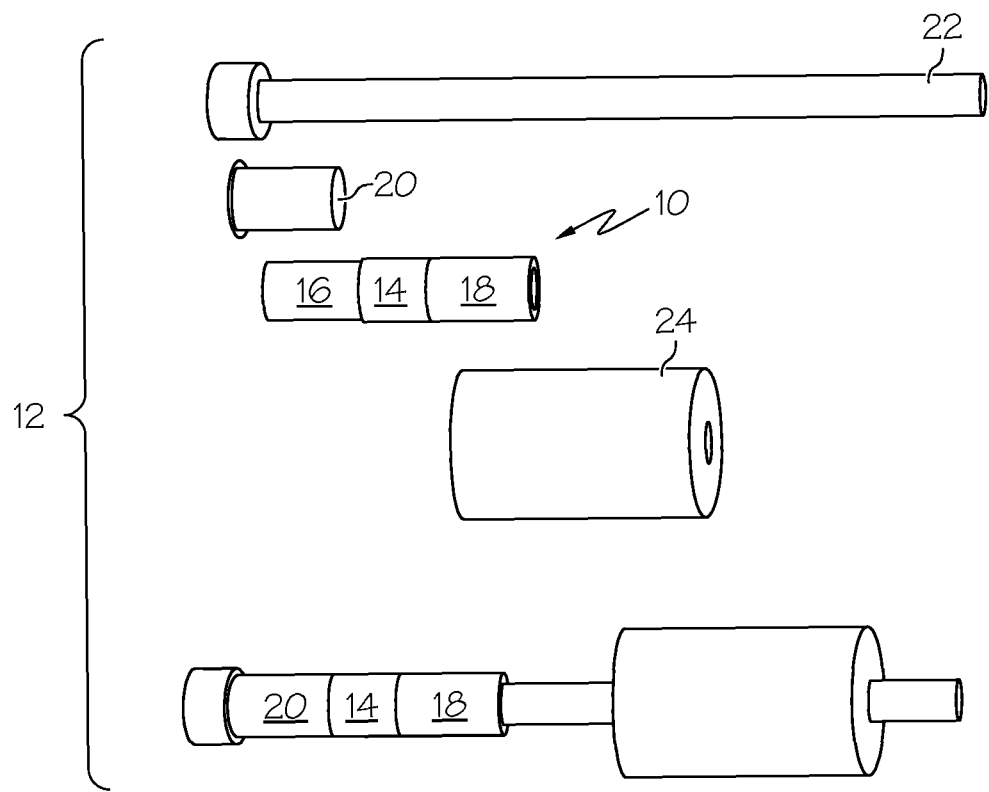
FIG. 2 is a side view of an installation system in accordance with one aspect of the present application.
Figure 3:
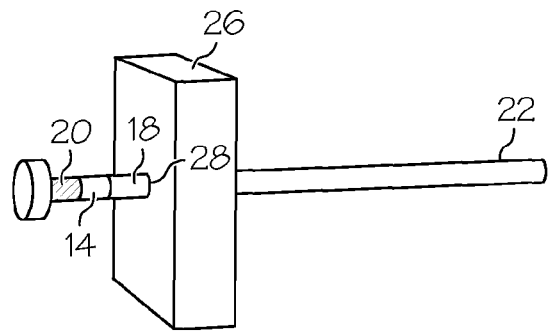
FIG. 3 is a diagram of the primary steps of installing a bushing in a composite structure in accordance with one aspect of the present application.
Figure 3:
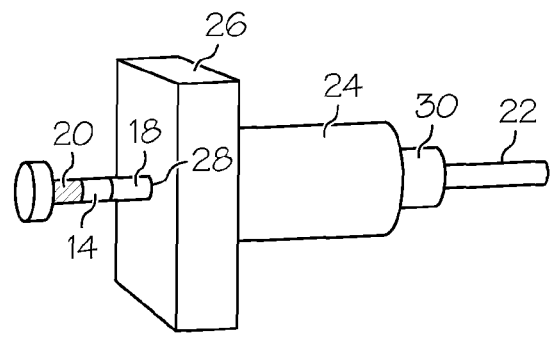
Figure 3:
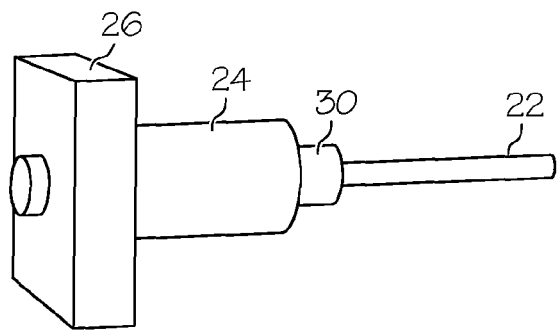
Figure 3:
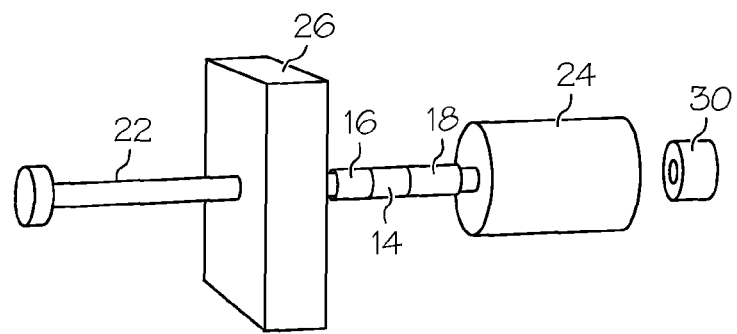

Referring to FIGS. 1 and 2, the basic installation mandrel 10 and installation mandrel system 12 are illustrated. The installation mandrel includes a tapered lead-in section 14, a bushing support section 16 and a straight positioning section 18. The bushing support section 16 is at one end of the mandrel and provides support to the bushing 20 during installation. The support section 16 prevents buckling of the bushing and provides a suitable method for using a very thin-walled bushing. The tapered lead-in section 14 is positioned between the bushing support section 16 and the straight positioning section 18. The tapered lead-in section 14 increases in diameter from the straight positioning section 18 to a maximum diameter immediately adjacent to the bushing support section 16. There is a step before the support section 16 where the installation mandrel 10 reduces in diameter from the maximum diameter of the tapered lead-in section 14 to the diameter of the support section 16. This transition is designed to smoothly guide the fibers of the CFRP material over the leading edge of the bushing 20 when positioned on the installation mandrel 10. The support section 16 fits inside the bushing to prevent buckling collapse of the bushing, and, thereby, provides a practical method for using a thin wall bushing. The installation mandrel system 12 as shown in FIG. 2 includes the installation mandrel 10, a driving rod 22, and a support mandrel 24.

In accordance with one aspect of the present application a bushing is installed in a composite material as follows: a wall 26 of composite material is drilled where it is desired to have a bushing to provide a cylindrical hole or opening 28 in the wall 26. Care is taken to drill a clean hole having a smooth side wall. The fabric present in the composite structure may be made up of layers of fibers such as unidirectional carbon fibers. The drilling of an opening 28 through this material exposes the ends of the fibers at the side wall boundary of the hole. These exposed ends of the conductive fibers provide an electrical path to the bulk of the CFRP structure.

The opening 28 is formed by the use of tools and processes known for creating holes in composite material. Next, a bushing 20 may be installed in the hole or opening 28 using tapered lead-in mandrel tool 10.

The bushing 20 is installed on the support section 16 of the mandrel 10 and a threaded driving rod 22 is inserted through the installation mandrel 10. The mandrel 10 is inserted through the hole 28 in the CFRP structure 26 with the straight positioning section 18 being advanced through the hole first until the taper in the tapered lead-in section 14 is snug against the hole walls. A support mandrel 24 is installed over the driving rod 22 and the protruding portion of the installation mandrel until the support mandrel 24 is snug against the CFRP surface 26. The support mandrel 24 supports the face of the composite and reacts to the forces of the rod pulling the bushing 20 into the structure 26. Typically, the ID of the support mandrel is only slightly larger than the bushing such that the CFRP material surrounding the hole 28 is supported very close to the edge of the hole, preventing delamination of the composite structure as the bushing 20 is forced into the hole. A driving nut 30 is installed on the driving rod 22 and the installation mandrel 10 and bushing 20 are drawn through the CFRP hole 28 by rotation of the driving nut until the bushing flange 32 (see FIG. 4) is flush against the surface of the CFRP structure 26. The tapered lead-in section 14 elastically expands the CFRP hole 28 to allow damage-free entry of the bushing 20. The mandrel 10 is disassembled and removed by unthreading the driving nut 30 from the driving rod 22. Although the foregoing description is directed to a simplified installation procedure, one of ordinary skill in the art will appreciate that other methods typically used to install similar features may be adapted to install the bushings described herein. For example, in a production environment, the driving rod could be clamped and pulled using a hydraulic or pneumatic device.

The bushing 20 typically is formed of a material that is chemically compatible with the composite material and of a material that has a coefficient of thermal expansion (CTE) that is close to the coefficient of thermal expansion of the composite structure. The term "close to" as used herein refers to a material having a coefficient of thermal expansion that is within about 300% of the value of the composite material. In accordance with other aspects of the invention, the CTE of the bushing material is within about 200%, more particularly about 100% and in certain cases about 50% of the value of the composite material. The matched CTE is important to structures such as aircraft wing components that experiences very large swings in temperatures during normal operation. A bushing with too high a CTE it will shrink more than the surrounding CFRP when exposed to cold temperatures and the interference fit between the bushing and the composite will be reduced or possibly lost completely. As the temperature at operating altitude is very low, such exposure to low temperatures is a routine occurrence for aircraft structure. The acceptable values for CTE are dependent on the stiffness of the selected bushing material. Examples of useful materials include, but are not limited to, tungsten, rhenium, nickel, iron, and the alloys of these materials. Tungsten has a CTE 86% above CFRP and some alloys of nickel and iron have a CTE 45% below that of CFRP. Stainless steel, by contrast, has a CTE 581% higher than CFRP.

Figure 4:
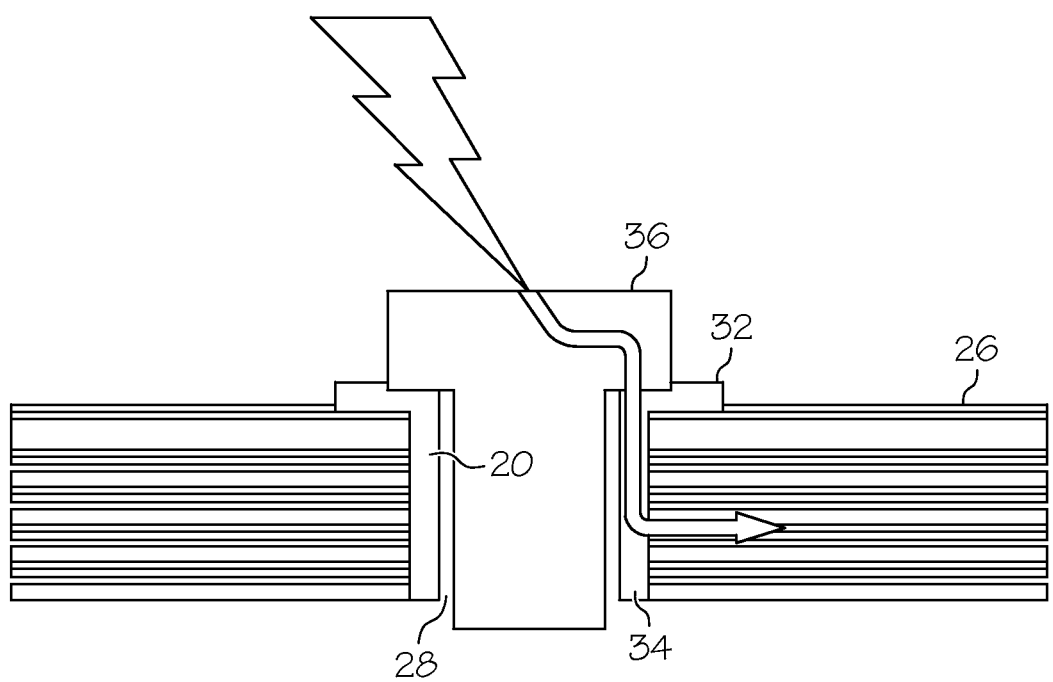
FIG. 4 is a sectional view of a bushing installed in a composite structure in accordance with one aspect of the present application.

As shown in FIG. 4, the bushing 20 includes a cylindrical main portion 34 and, in certain embodiments, a flange portion 32 at one end of the bushing. The main portion 34 is sized to snugly fit within the cylindrical hole 28 to provide an interference fit. The flange portion 32 facilitates formation of a reliable electrical path between the fastener 36 and the composite structure 26 for EME protection. In accordance with particular aspects, the cylindrical main portion of the bushing may have a wall thickness of between about 0.010 and 0.020 inches, more particularly about 0.010 and 0.015 inches.

In accordance with certain aspects, the bushings are manufactured and installed at their final size. Once installed, the bushing 20 is an integral part of the structure, providing physical protection for the fastener hole and ensuring that the EME-protection feature remains in place during maintenance and repair. Reliability of the electrical pathway is ensured by the selection of the appropriate bushing materials. The bushing 20 disclosed herein provides an electrical path between a systems component and the conductive carbon fibers in the CFRP structure through existing metallic fasteners. In accordance with certain aspects, the method described herein provides a structure capable of conducting electrical current into the CFRP from some attached element through a mechanical fastener. For practical reasons, the fasteners typically are clearance fit, resulting in a gap between the shaft of the fastener and the exposed fibers of the drilled hole. The gap between the fastener and the wall of the hole prevents a reliable electrical path between the fastener and the wall 26. The bushing 20 creates a reliable electrical path with the wall of the hole and then makes a reliable path to the fastener through the flange 32 of the bushing.

The bushing is designed to retain the interference fit under typical operating conditions and remain in the installed position for the life of the aircraft. The external diameter of the bushing 20 and the inner diameter of the generated hole 28 are tightly controlled to ensure an appropriate degree of interference fit between the bushing 20 and the composite wall 26.

In addition to providing a robust electrical connection between the fastener and the composite structure, the presence of the bushing will physically protect the holes. The components mounted in these holes typically are service-replaceable items and the fasteners on occasion may be removed and reinstalled. Any time a fastener is removed or the hole is exposed with nothing installed there is the potential for the hole and the surrounding composite to be damaged. The presence of the metallic bushing 20 prevents this damage and, in some cases, may eliminate the need for complex repair or rework that would be required if the hole were damaged. In accordance with certain embodiments, the bushings are utilized in composite structures useful in assembly of aircraft. The structures are particularly useful in the critical fuel tank areas to provide a reliable electrical path into the main structure to prevent electrical potential (voltage) build-up which can lead to sparking. Sparking in these areas is extremely dangerous due to the potential for ignition of fuel and fuel vapors. The installation method described herein provides for installation of the bushing without damaging the composite structure.

Although the embodiments described herein are directed towards component used in aircraft, the aspects of the present application may be applied to other structures such as automobiles, boats, etc.

Although various aspects of the disclosed bushings and associated methods for minimizing the effects of lightning strikes have been shown and described, modifications may occur to those skilled in the art upon reading the specification. The present application includes such modifications and is limited only by the scope of the claims.

What is claimed is:

1. A method for providing robust electrical bonding to a composite structure, said method comprising the steps of:
   forming a hole in a composite structure, wherein the hole includes an inner diameter; and
   positioning a bushing having an outer diameter into the hole to create an interference fit between the outer diameter of the bushing and the inner diameter of the hole of the composite structure, wherein said bushing is formed of a material that has a coefficient of thermal expansion within about 300% of the coefficient of thermal expansion of the composite structure and said bushing provides an electrical path between a fastener disposed in said bushing and the composite structure.

2. The method of claim 1 wherein said bushing is formed of tungsten, rhenium, nickel, iron or alloys containing these materials.

3. The method of claim 1 wherein said composite structure comprises carbon fibers.

4. The method of claim 3 wherein said composite structure comprises a carbon reinforced polymer material.

5. The method of claim 1 wherein said bushing is cylindrical with a wall thickness of between about 0.010 and 0.020 inches.

6. The method of claim 1 wherein said bushing further comprises an annular flange at one end of the bushing.

7. The method of claim 1 further comprising temporarily expanding the hole prior to positioning the bushing in the hole.

8. The method of claim 7 wherein a tapered lead-in mandrel is used to temporarily expand the hole and position the bushing in the hole.

9. The method of claim 8 wherein the mandrel also provides support to the bushing during positioning of the bushing.

10. The method of claim 1 wherein the composite structure is part of an aircraft.

11. A method of installing a bushing in a hole in a composite structure comprising:
   providing a mandrel having, in order, a bushing support section, a tapered lead-in section, and a straight positioning section, wherein the tapered lead-in section increases in diameter from the straight positioning section to a maximum diameter immediately adjacent to the bushing support section;
   installing the bushing on the bushing support section of the mandrel;
   inserting the straight positioning section of the mandrel into the hole; and
   moving the mandrel through the hole thereby temporarily expanding the hole radially to facilitate installation of the bushing in the hole and creation of an interference fit between the bushing and the composite structure, wherein said bushing is formed of a material that has a coefficient of thermal expansion within about 300% of the coefficient of thermal expansion of the composite structure and said bushing provides an electrical path between a fastener disposed in said bushing and the composite structure.

12. The method of claim 11 wherein said bushing is formed of tungsten, rhenium, nickel, iron, or alloys containing these materials.

13. The method of claim 11 wherein said composite structure comprises carbon fibers.

14. The method of claim 13 wherein said composite structure comprises a carbon reinforced polymer material.

15. The method of claim 11 wherein said bushing is cylindrical with a wall thickness of between about 0.010 and 0.020 inches.

16. The method of claim 11 wherein said bushing further comprises an annular flange at one end of the bushing.

17. The method of claim 11 wherein the composite structure is part of an aircraft.

18. An apparatus comprising:
   a composite structure comprising a carbon reinforced polymer material having a hole including an inner diameter therein and a bushing including an outer diameter, the bushing disposed in said hole such that there is an interference fit between the outer diameter of the bushing and the inner diameter of the hole of the composite structure, wherein said bushing is formed of a material that has a coefficient of thermal expansion within about 300% of the coefficient of thermal expansion of the composite structure and said bushing provides an electrical path between a fastener disposed in said bushing and the composite structure.

19. The apparatus of claim 18 wherein said bushing is formed of tungsten, rhenium, nickel, iron or alloys containing these materials.

20. The apparatus of claim 19 wherein said bushing is cylindrical with a wall thickness of between about 0.010 and 0.020 inches and comprises an annular flange at one end of the bushing.

* * * * *